US008437396B2

(12) United States Patent
Qiu et al.

(10) Patent No.: US 8,437,396 B2
(45) Date of Patent: May 7, 2013

(54) MOTION SEARCH MODULE WITH FIELD AND FRAME PROCESSING AND METHODS FOR USE THEREWITH

(75) Inventors: Gang Qiu, Richmond Hill (CA); Xu Gang (Wilf) Zhao, Toronto (CA); Xinghai Li, North York (CA)

(73) Assignee: ViXS Systems, Inc., Toronto, Ontario (CA)

(*) Notice: Subject to any disclaimer, the term of this patent is extended or adjusted under 35 U.S.C. 154(b) by 2036 days.

(21) Appl. No.: 11/502,194

(22) Filed: Aug. 10, 2006

(65) Prior Publication Data

US 2008/0037641 A1    Feb. 14, 2008

(51) Int. Cl.
*H04N 7/12*    (2006.01)
*H04N 11/02*    (2006.01)
*H04N 11/04*    (2006.01)

(52) U.S. Cl.
USPC ............ 375/240.16; 375/240.12; 375/240.14; 375/240.2; 375/240.24; 382/234; 382/235; 382/236; 348/402.1; 348/412.1; 348/413.1; 348/415.1; 348/416.1

(58) Field of Classification Search ......... 375/240.01–240.29; 348/402.1, 348/412.1, 413.1, 415.1, 416.1; 382/234, 382/235, 236
See application file for complete search history.

(56) References Cited

U.S. PATENT DOCUMENTS

| 7,362,809 | B2* | 4/2008 | Booth et al. | 375/240.16 |
|---|---|---|---|---|
| 7,499,491 | B2* | 3/2009 | Lee et al. | 375/240.12 |
| 7,580,456 | B2* | 8/2009 | Li et al. | 375/240 |
| 2002/0176500 | A1* | 11/2002 | Bakhmutsky et al. | 375/240.13 |
| 2003/0118111 | A1* | 6/2003 | Kim et al. | 375/240.24 |
| 2004/0114688 | A1* | 6/2004 | Kang | 375/240.12 |
| 2005/0053134 | A1* | 3/2005 | Holcomb | 375/240.12 |
| 2005/0089098 | A1* | 4/2005 | Sato et al. | 375/240.16 |
| 2007/0009026 | A1* | 1/2007 | Kwon et al. | 375/240.03 |
| 2007/0014368 | A1* | 1/2007 | MacInnis et al. | 375/240.24 |
| 2008/0025395 | A1* | 1/2008 | Nemiroff et al. | 375/240.12 |

* cited by examiner

*Primary Examiner* — Sath V Perungavoor
*Assistant Examiner* — Nathnael Aynalem
(74) *Attorney, Agent, or Firm* — Garlick & Markison; Bruce E. Stuckman (57) ABSTRACT

A motion compensation module, that can be used in a video encoder for encoding a video input signal, includes a motion search module that generates a motion search motion vector for each macroblock of a plurality of macroblocks by contemporaneously evaluating a top frame macroblock and bottom frame macroblock from a frame of the video input signal and a top field macroblock and a bottom field macroblock from corresponding fields of the video input signal. A motion refinement module, when enabled, generates a refined motion vector for each macroblock of the plurality of macroblocks, based on the motion search motion vector.

28 Claims, 9 Drawing Sheets

MOTION SEARCH MODULE WITH FIELD AND FRAME PROCESSING AND METHODS FOR USE THEREWITH

TECHNICAL FIELD OF THE INVENTION

The present invention relates to motion search, motion compensation and related methods used in devices such as video encoders/codecs.

DESCRIPTION OF RELATED ART

Video encoding has become an important issue for modern video processing devices. Robust encoding algorithms allow video signals to be transmitted with reduced bandwidth and stored in less memory. However, the accuracy of these encoding methods face the scrutiny of users that are becoming accustomed to greater resolution and higher picture quality. Standards have been promulgated for many encoding methods including the H.264 standard that is also referred to as MPEG-4, part 10 or Advanced Video Coding, (AVC). While this standard sets forth many powerful techniques, further improvements are possible to improve the performance and speed of implementation of such methods.

Further limitations and disadvantages of conventional and traditional approaches will become apparent to one of ordinary skill in the art through comparison of such systems with the present invention.

DETAILED DESCRIPTION OF THE INVENTION INCLUDING THE PRESENTLY PREFERRED EMBODIMENTS

Figures 1, 2, 3:
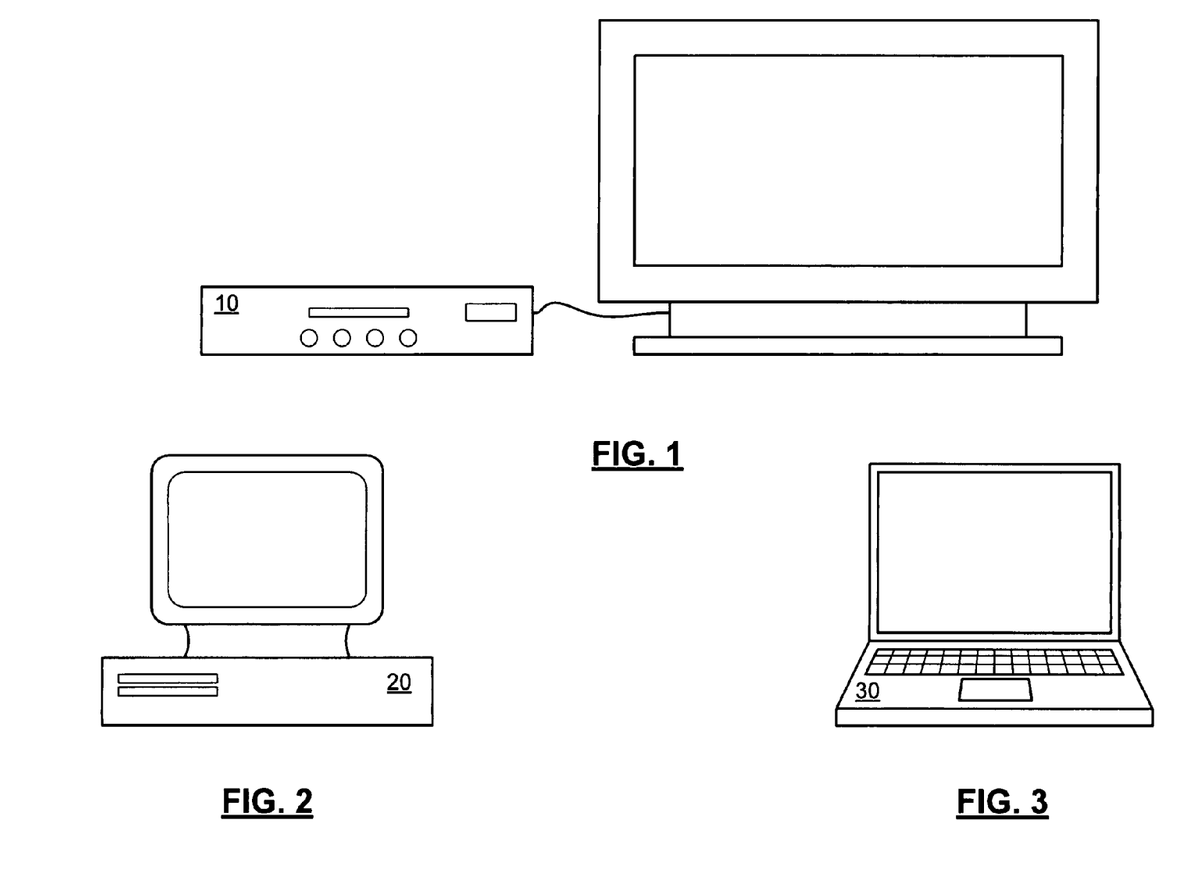
FIGS. 1-3 present pictorial diagram representations of a various video processing devices in accordance with embodiments of the present invention.

FIGS. 1-3 present pictorial diagram representations of a various video processing devices in accordance with embodiments of the present invention. In particular, set top box 10 with built-in digital video recorder functionality or a stand alone digital video recorder, computer 20 and portable computer 30 illustrate electronic devices that incorporate a video processing device 125 that includes one or more features or functions of the present invention. While these particular devices are illustrated, video processing device 125 includes any device that is capable of encoding video content in accordance with the methods and systems described in conjunction with FIGS. 4-9 and the appended claims.

Figure 4:
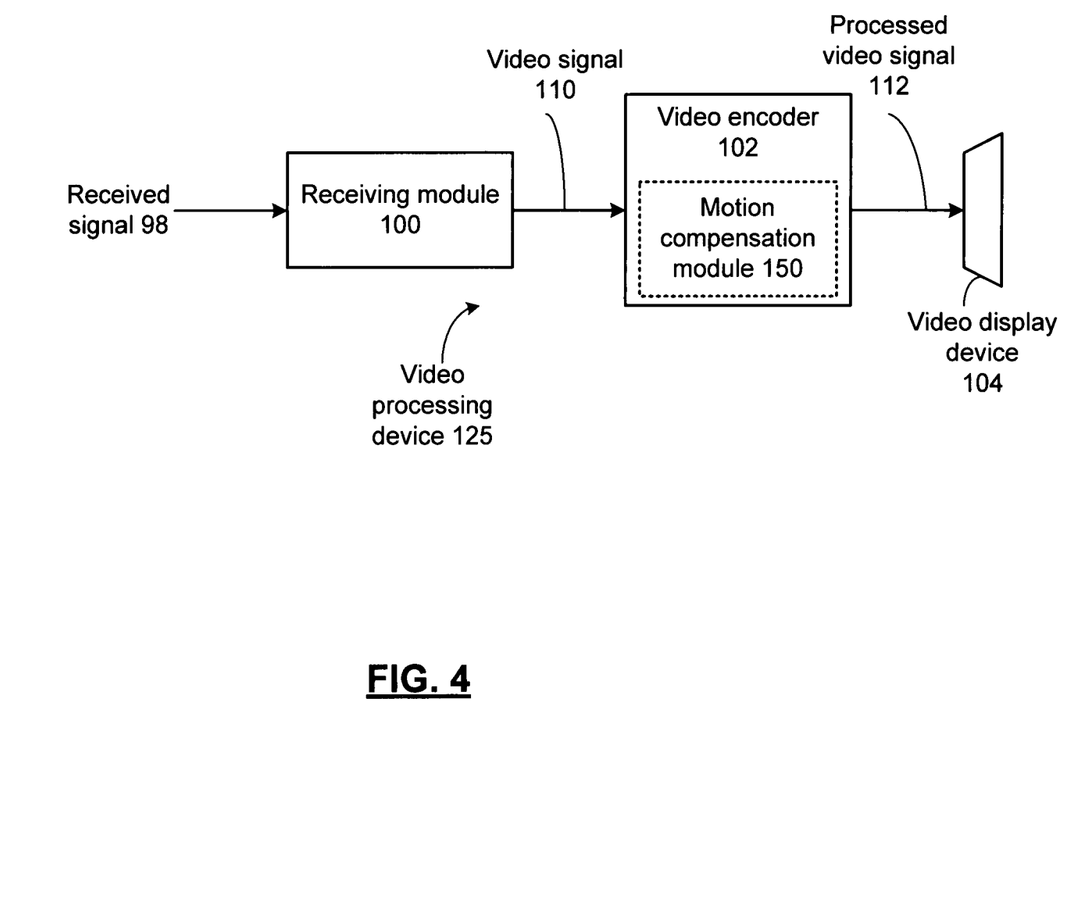
FIG. 4 presents a block diagram representation of a video processing device 125 in accordance with an embodiment of the present invention.

FIG. 4 presents a block diagram representation of a video processing device 125 in accordance with an embodiment of the present invention. In particular, video processing device 125 includes a receiving module 100, such as a television receiver, cable television receiver, satellite broadcast receiver, broadband modem, 3G transceiver or other information receiver or transceiver that is capable of receiving a received signal 98 and extracting one or more video signals 110 via time division demultiplexing, frequency division demultiplexing or other demultiplexing technique. Video encoding module 102 is coupled to the receiving module 100 to encode or transcode the video signal in a format corresponding to video display device 104.

In an embodiment of the present invention, the received signal 98 is a broadcast video signal, such as a television signal, high definition televisions signal, enhanced high definition television signal or other broadcast video signal that has been transmitted over a wireless medium, either directly or through one or more satellites or other relay stations or through a cable network, optical network or other transmission network. In addition, received signal 98 can be generated from a stored video file, played back from a recording medium such as a magnetic tape, magnetic disk or optical disk, and can include a streaming video signal that is transmitted over a public or private network such as a local area network, wide area network, metropolitan area network or the Internet.

Video signal 110 can include an analog video signal that is formatted in any of a number of video formats including National Television Systems Committee (NTSC), Phase Alternating Line (PAL) or Sequentiel Couleur Avec Memoire (SECAM). Processed video signal includes 112 a digital video codec standard such as H.264, MPEG-4 Part 10 Advanced Video Coding (AVC) or other digital format such as a Motion Picture Experts Group (MPEG) format (such as MPEG1, MPEG2 or MPEG4), Quicktime format, Real Media format, Windows Media Video (WMV) or Audio Video Interleave (AVI), or another digital video format, either standard or proprietary.

Video display devices 104 can include a television, monitor, computer, handheld device or other video display device that creates an optical image stream either directly or indirectly, such as by projection, based on decoding the processed video signal 112 either as a streaming video signal or by playback of a stored digital video file.

Video encoder 102 includes a motion compensation module 150 that operates in accordance with the present invention and, in particular, includes many optional functions and features described in conjunction with FIGS. 5-9 that follow.

Figure 5:
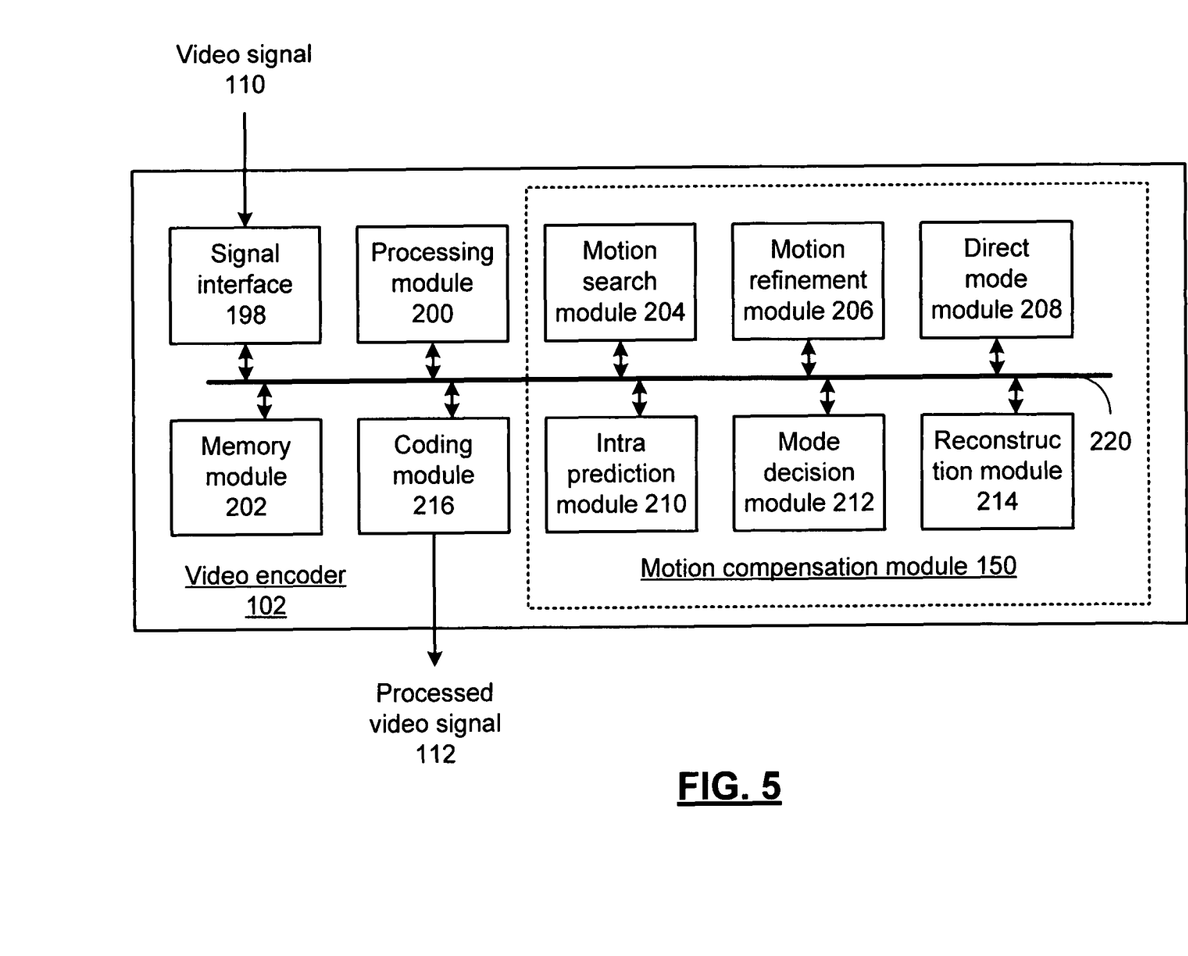
FIG. 5 presents a block diagram representation of a video encoder 102 that includes motion compensation module 150 in accordance with an embodiment of the present invention.

FIG. 5 presents a block diagram representation of a video encoder 102 that includes motion compensation module 150 in accordance with an embodiment of the present invention. In particular, video encoder 102 operates in accordance with many of the functions and features of the H.264 standard, the MPEG-4 standard, VC-1 (SMPTE standard 421M) or other standard, to encode a video input signal 110 that is converted to a digital format via a signal interface 198.

The video encoder 102 includes a processing module 200 that can be implemented using a single processing device or a plurality of processing devices. Such a processing device may be a microprocessor, co-processors, a micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions that are stored in a memory, such as memory module 202. Memory module 202 may be a single memory device or a plurality of memory devices. Such a memory device can include a hard disk drive or other disk drive, read-only memory, random access memory, volatile memory, non-volatile memory, static memory, dynamic memory, flash memory, cache memory, and/or any device that stores digital information. Note that when the processing module implements one or more of its functions via a state machine, analog circuitry, digital circuitry, and/or logic circuitry, the memory storing the corresponding operational instructions may be embedded within, or external to, the circuitry comprising the state machine, analog circuitry, digital circuitry, and/or logic circuitry.

Processing module 200, and memory module 202 are coupled, via bus 220, to the signal interface 198 and a plurality of other modules, such as motion search module 204, motion refinement module 206, direct mode module 208, intra-prediction module 210, mode decision module 212, reconstruction module 214 and coding module 216. The modules of video encoder 102 can be implemented in software, firmware or hardware, depending on the particular implementation of processing module 200. It should also be noted that the software implementations of the present invention can be stored on a tangible storage medium such as a magnetic or optical disk, read-only memory or random access memory and also be produced as an article of manufacture. While a particular bus architecture is shown, alternative architectures using direct connectivity between one or more modules and/or additional busses can likewise be implemented in accordance with the present invention.

Motion compensation module 150 includes a motion search module 204 that processes pictures from the video input signal 110 based on a segmentation into macroblocks of pixel values, such as of 16 pixels by 16 pixels size, from the columns and rows of a frame and/or field of the video input signal 110. In an embodiment of the present invention, the motion search module determines, for each macroblock or macroblock pair of a field and/or frame of the video signal one or more motion vectors (depending on the partitioning of the macroblock into subblocks described further in conjunction with FIG. 8) that represent the displacement of the macroblock (or subblock) from a reference frame or reference field of the video signal to a current frame or field. In operation, the motion search module operates within a search range to locate a macroblock (or subblock) in the current frame or field to an integer pixel level accuracy such as to a resolution of 1-pixel. Candidate locations are evaluated based on a cost formulation to determine the location and corresponding motion vector that have a most favorable (such as lowest) cost.

In an embodiment of the present invention, a cost formulation is based on the sum of the Sum of Absolute Differences (SAD) between the reference macroblock and candidate macroblock pixel values and a weighted rate term that represents the number of bits required to be spent on coding the difference between the candidate motion vector and an estimated predicted motion vector that is determined based on motion vectors from neighboring macroblocks of a prior row of the video input signal—and not based on motion vectors from neighboring macroblocks of the row of the current macroblock. Because the cost formulation avoids the use of motion vectors from the current row, the motion search module can optionally operate on an entire row of video input signal 110 in parallel, to contemporaneously determine the motion search motion vector for each macroblock in the row. In addition, the cost calculation avoids the use of neighboring subblocks within the current macroblock. In this fashion, motion search module 204 is able to operate on a macroblock to contemporaneously determine the motion search motion vector for each subblock of the macroblock.

A motion refinement module 206 that generates a refined motion vector for each macroblock of the plurality of macroblocks, based on the motion search motion vector. In an embodiment of the present invention, the motion refinement module determines, for each macroblock or macroblock pair of a field and/or frame of the video input signal 110 a refined motion vector that represents the displacement of the macroblock from a reference frame or reference field of the video signal to a current frame or field. In operation, the motion refinement module refines the location of the macroblock in the current frame or field to a greater pixel level accuracy such as to a resolution of ¼-pixel. Candidate locations are also evaluated based on a cost formulation to determine the location and refined motion vector that have a most favorable (such as lowest) cost. As in the case with the motion search module, a cost formulation is based on the a sum of the Sum of Absolute Difference (SAD) between the reference macroblock and candidate macroblock pixel values and a weighted rate term that represents the number of bits required to be spent on coding the difference between the candidate motion vector and an estimated predicted motion vector that is calculated based on motion vectors from neighboring macroblocks of a prior row of the video input signal—and not based on motion vectors from neighboring macroblocks of the row of the current macroblock. Because the cost formulation avoids the use of motion vectors from the current row, the motion refinement module can optionally operate on an entire row of video input signal 110 in parallel, to contemporaneously determine the refined motion vector for each macroblock in the row. In addition, the cost calculation avoids the use of neighboring subblocks within the current macroblock. Motion refinement module 206 is able to operate on a macroblock to contemporaneously determine the motion search motion vector for each subblock of the macroblock. In this fashion the motion search module 204 and the motion refinement module 206 are pipelined and operate in parallel to process each of the plurality of macroblocks in the row of the video input signal 110.

In an embodiment of the present invention, the motion refinement module 206 can be selectively enabled or disabled. In particular, if the motion search module achieves sufficient results in determining a motion search motion vector, such as when the motion is highly predictable, little or no motion is present, etc., the motion refinement module 208 can be disabled on a macroblock by macroblock basis to skip the refinement of the motion search motion vector for the particular macroblock. In this case, the motion search motion vector is assigned to be the refined motion vector. Further examples of this procedure will be discussed with greater particularity in conjunction with FIGS. 6 and 11.

A direct mode module 208 generates a direct mode motion vector for each macroblock of the plurality of macroblocks, based on a plurality of macroblocks that neighbor the macroblock of pixels. In an embodiment of the present invention, the direct mode module 208 operates in a fashion such as defined by the H.264 standard to determine the direct mode motion vector and the cost associated with the direct mode motion vector.

While the prior modules have focused on inter-prediction of the motion vector, intra-prediction module 210 generates a best intra prediction mode for each macroblock of the plurality of macroblocks. In particular, intra-prediction module 210 operates in a fashion such as defined by the H.264 standard to evaluate a plurality of intra prediction modes to determine the best intra prediction mode and the associated cost.

A mode decision module 212 determines a final motion vector for each macroblock of the plurality of macroblocks based on costs associated with the refined motion vector, the direct mode motion vector, and the best intra prediction mode, and in particular, the method that yields the most favorable (lowest) cost, or otherwise an acceptable cost. A reconstruction module 214 generates residual luma and chroma pixel values corresponding to the final motion vector for each macroblock of the plurality of macroblocks.

A coding module 216 of video encoder 102 generates processed video signal 112 by transforming coding and quantizing the motion vector and residual pixel values into quantized transformed coefficients that can be further coded, such as by entropy coding, to be transmitted and/or stored as the processed video signal 112.

While not expressly shown, video encoder 102 can include a memory cache, a memory management module, a filter module, such as an in-loop deblocking filter, comb filter or other video filter, and/or other module to support the encoding of video input signal 110 into processed video signal 112.

Figure 6:
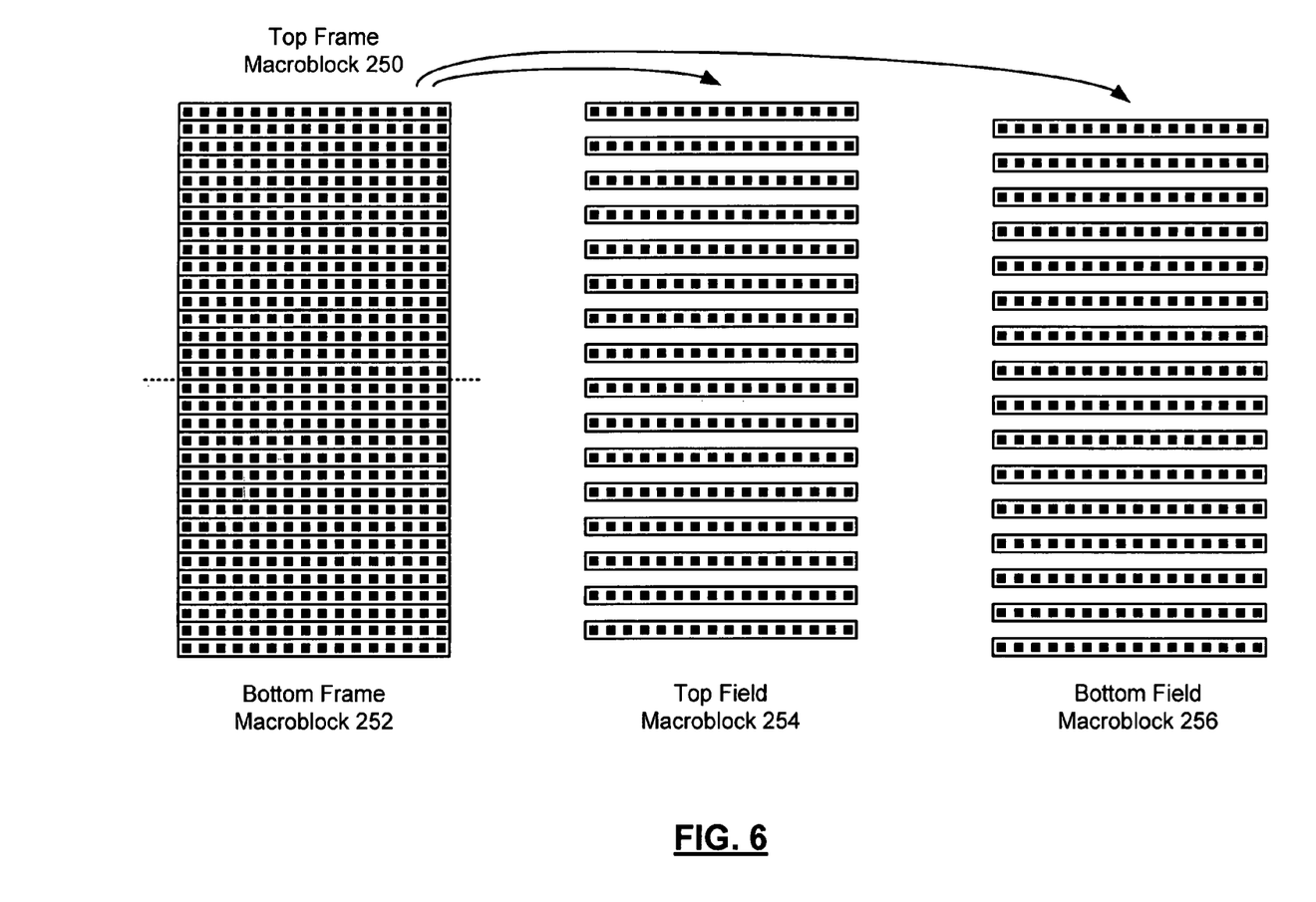
FIG. 6 presents a graphical representation of the relationship between example top frame and bottom frame macroblocks (250, 252) and example top field and bottom field macroblocks (254, 256) in accordance with an embodiment of the present invention.

FIG. 6 presents a graphical representation of the relationship between example top frame and bottom frame macroblocks (250, 252) and example top field and bottom field macroblocks (254, 256) in accordance with an embodiment of the present invention. In this embodiment, motion search module 204 generates a motion search motion vector for each macroblock of a plurality of macroblocks by contemporaneously evaluating a top frame macroblock 250 and bottom frame macroblock 252 from a frame of the video input signal 110 and a top field macroblock 254 and a bottom field macroblock 256 from corresponding fields of the video input signal 110.

Considering the example shown, each of the macroblocks are 16 pixels by 16 pixels in size. Motion search is performed in full pixel resolution, or other resolution, either coarser or finer, by comparing a candidate frame macroblock pair of a current frame that includes top frame macroblock 250 and bottom frame macroblock 252 to the macroblock pair of a reference frame. In addition, lines of a first parity (such as odd lines) from the candidate frame macroblock pair are grouped to form top field macroblock 254. Similarly, lines of a second parity (such as even lines) from the candidate frame macroblock pair are grouped to form bottom field macroblock 256. Motion search module 204 calculates a cost associated a plurality of lines, and generates a cost associated with the top frame macroblock 250 based on a cost accumulated for a plurality of top lines of the plurality of lines, generates a cost associated with the bottom frame macroblock 252 based on a cost accumulated for a plurality of bottom lines of the plurality of lines, generates a cost associated with the top field macroblock 254 based on a cost accumulated for a plurality of first-parity lines of the plurality of lines compared with either a top or bottom field reference, and generates a cost associated with the bottom field macroblock 256 based on a cost accumulated for a plurality of second-parity lines of the plurality of lines, also based on either a top or bottom field reference. In this fashion, six costs can be generated contemporaneously for the macroblock pair: top frame compared with top frame of the reference; bottom frame compared with the bottom frame of the reference; top field compared with top field of the reference; bottom field compared with the bottom field of the reference; top field compared with bottom field of the reference; and bottom field compared with the top field of the reference.

While the example shown is based on macroblocks of 16×16 size, other macroblock dimensions that are larger or smaller, square or non-square, may likewise be implemented in accordance with the broader scope of the present invention.

Each of these costs can be generated based on the sum of the absolute differences (SAD) of the pixel values of the current frame or field with the reference frame or field. The SADs can be calculated contemporaneously, in a single pass, based on the accumulation for each line. The overall SAD for a particular macroblock (top or bottom, frame or field) can be determined by totaling the SADs for the lines that make up that particular macroblock. Alternatively, the SADs can be calculated in a single pass, based on the smaller segments such as 4×1 segments that can be accumulated into subblocks, that in turn can be accumulated into overall macroblock totals. This alternative arrangement particularly lends itself to motion search modules that operate based on the partitioning of macroblocks into smaller subblocks, as will be discussed further in conjunction with FIG. 8.

The motion search module 204 is particularly well adapted to operation in conjunction with macroblock adaptive frame and field processing. Frame mode costs for the current macroblock pair can be generated as discussed above. In addition, motion search module 204 optionally generates a field decision based on accumulated differences, such as SAD, between the current bottom field macroblock and a bottom field macroblock reference, the current bottom field macroblock and a top field macroblock reference, the current top field macroblock and the bottom field macroblock reference, and the current top field macroblock and the top field macroblock reference. The field decision includes determining which combination (top/top, bottom/bottom) or (top/bottom, bottom/top) yields a lower cost. Similarly, motion search module 204 can optionally choose a frame mode or field mode for a particular macroblock pair, based on whether the frame mode cost compares more favorably (e.g. are lower) or less favorably (e.g. higher) to the field mode cost, based on the field mode decision.

Figure 7:
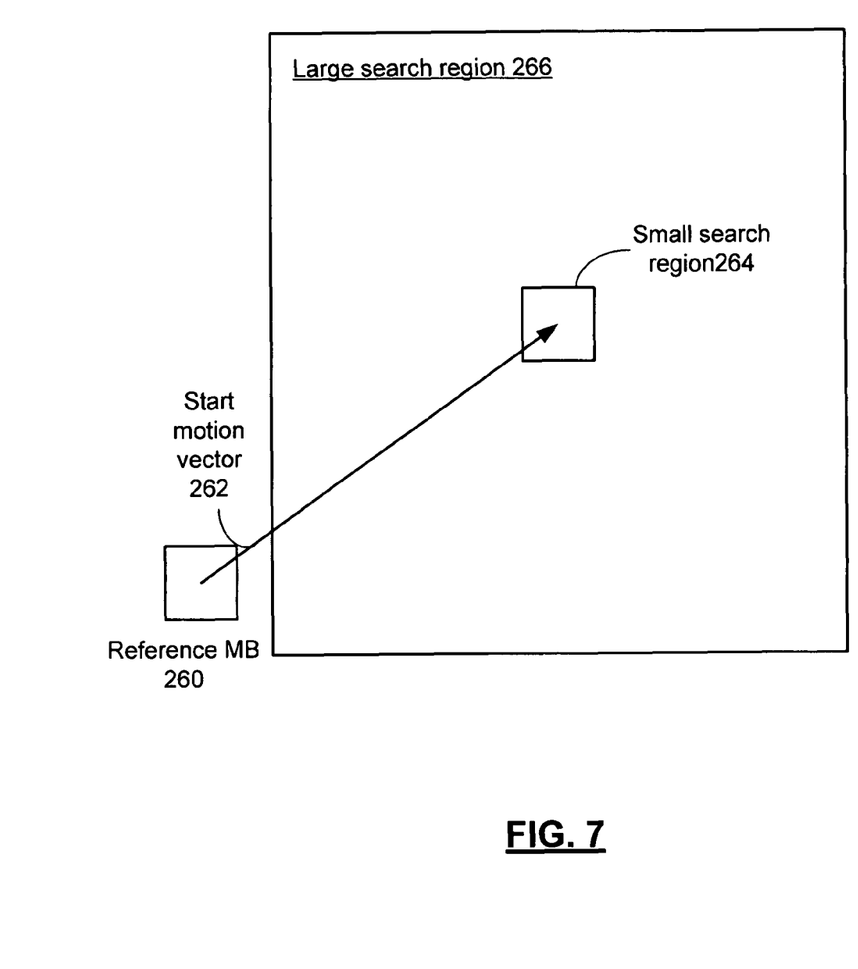
FIG. 7 presents a graphical representation of example small search region 264 and large search region 266 in accordance with an embodiment of the present invention.

FIG. 7 presents a graphical representation of example small search region 264 and large search region 266 in accordance with an embodiment of the present invention. While the preceding discussion has focused more on the evaluation of candidate motion vectors for a current macroblock pair, FIG. 7 illustrates how candidate motion vectors can be chosen for evaluation. In particular, the motion search module 204 includes small search, stationary checking and large search procedures that can be separately enabled or disabled. When enabled, the motion search module 204 initiates the small search in a small search region 264 centered on a location defined by a start motion vector 262 that is offset by a reference location of the reference macroblock 260 (such as a center pixel location) and evaluates a cost associated with a plurality of candidate motion search motion vectors. The start motion vector 262 can be determined based on a predicted motion vector (PMV) or estimated predicted motion vector (EPMV) that is determined based on the motion vectors from macroblocks that are neighboring the current macroblock 260. In an embodiment of the present invention, the small search region is a 16 pixels×16 pixels range that is centered on the location defined by the start motion vector 262.

The small search proceeds to evaluate the costs associated with each location in the small search region in an order, such as the middle column first, the two adjacent columns next and so on working outward until the entire small search region is evaluated. In an embodiment of the present invention, the small search procedure can include an early termination feature that is selectively enabled or disabled. When early termination is enabled, the cost associated with each candidate motion vector is compared with a small search cost threshold and the small search terminates the evaluation when the cost associated with one of the plurality of candidate motion search motion vectors within the small search region compares favorably to the small search cost threshold. In this case, the motion search module 204 assigns the motion search motion vector to the particular candidate motion vector and disables the large search procedure.

In an embodiment of the present invention, the motion search module 204 further includes a stationary check procedure that can also be selectively enabled or disabled. When enabled, the stationary check procedure compares a cost associated with a stationary motion vector (such as a motion vector with no offset, e.g. (0,0)) to a stationary cost threshold. When the cost associated the stationary motion vector compares favorably to the stationary cost threshold, the motion search module 204 disables large search and assigns the stationary motion vector as the motion search motion vector. In addition, motion search module 204 can optionally disable the motion refinement module for the particular one of the plurality of macroblocks, and assign the stationary motion vector directly as the refined motion vector.

In an embodiment of the present invention, the motion search module 204 also determines a most favorable cost motion vector from the plurality of candidate motion search motion vectors within the small search region, compares the most favorable cost motion vector to a middle cost threshold and when, for a particular one of the plurality of macroblocks, the cost associated the most favorable cost motion vector compares favorably to the middle cost threshold, the motion search module terminates the motion search and assigns the most favorable cost motion vector as the motion search motion vector.

If enabled (if the motion search has not terminated early in either the small search, stationary check, or middle check procedures) the motion search module proceeds to initiate a large search in a large search region 266, larger than the small search region (such as 128×128), centered on the start motion vector. The large search procedure evaluates a cost associated with a plurality of candidate motion search motion vectors within the large search region, compares the cost associated with each with a large search cost threshold and terminates the evaluation if the cost associated with one of the plurality of candidate motion search motion vectors within the large search region compares favorably to the large search cost threshold. Otherwise, the motion search module 204 assigns the motion search motion vector to be the candidate motion vector in the large search region that has the most favorable (e.g. lowest) cost.

Figure 8:
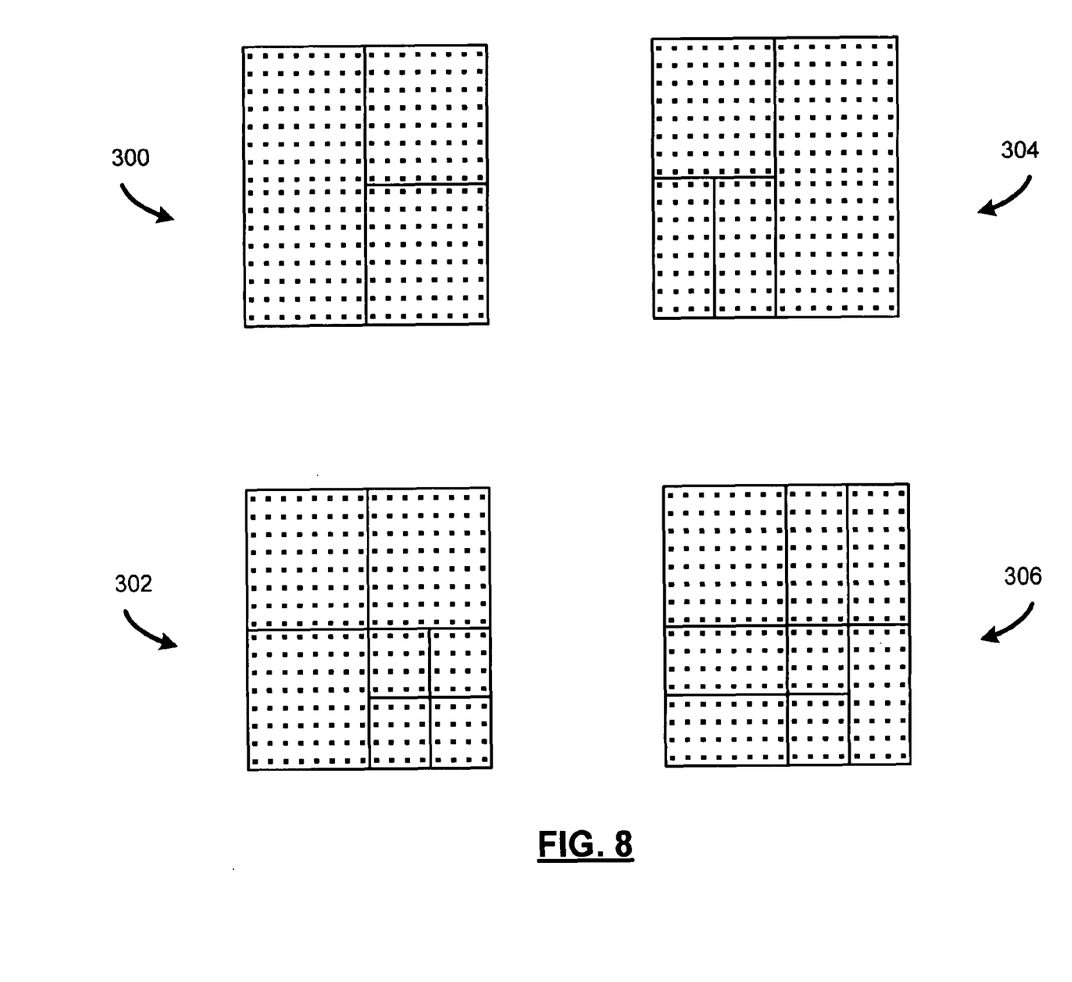
FIG. 8 presents a graphical representation that shows example macroblock partitioning in accordance with an embodiment of the present invention.

FIG. 8 presents a graphical representation that shows example macroblock partitioning in accordance with an embodiment of the present invention. In particular, while the modules described in conjunction with FIG. 5 above can operate on macroblocks having a size such as 16 pixels×16 pixels, such as in accordance with the H.264 standard, macroblocks can be partitioned into subblocks of smaller size, as small as 4 pixels on a side with the functions and features described in conjunction with the macroblocks applying to each subblock with individual pixel locations indicated by dots. For example, motion search module 204 can generate separate motion search motion vectors for each subblock of each macroblock.

Macroblocks 300, 302, 304 and 306 represent examples of such partitioning into subblocks. Macroblock 302 represents an example of partitioning into subblocks in accordance with the H.264 standard. Macroblocks 300, 304 and 306 represent examples of other possible partitioning into subblocks. In particular, macroblock 300 is a 16×16 macroblock that is partitioned into an 8×16 subblock and two 8×8 subblocks. Macroblock 302 is a 16×16 macroblock that is partitioned into three 8×8 subblocks and four 4×4 subblocks. Macroblock 304 is a 16×16 macroblock that is partitioned into an 8×16 subblock, an 8×8 subblock and two 4×8 subblocks. Macroblock 306 is a 16×16 macroblock that is partitioned into an 8×8 subblock, three 4×8 subblocks, two 8×4 subblocks, and two 4×4 subblocks. The partitioning of the macroblocks into smaller subblocks increases the complexity of the motion compensation by requiring various compensation methods, such as the motion search to determine, not only the motion search motion vectors for each subblock, but the best motion vectors for each subblock over the set of all possible partitions of a particular macroblock. The result however can yield more accurate motion compensation and reduced compression artifacts in the decoded video image.

In an embodiment of the present invention, the motion search module 204 not only evaluates both frame and field mode for the macroblock pair in one pass, it also evaluates, in one pass, a plurality of possible partitions of each macroblock, such as all possible partitions into subblocks of 4×4, 4×8, 8×4, 8×8, 16×8 and 8×16 of each macroblock (frame and field) of the macroblock pair. In an embodiment, motion search module 204 compares the cost associated with the plurality of partitions of each macroblock to a cost threshold and terminates the evaluation of candidate partitions if the cost associated with a particular partition of the plurality of partitions compares favorably to the cost threshold.

Figure 9:
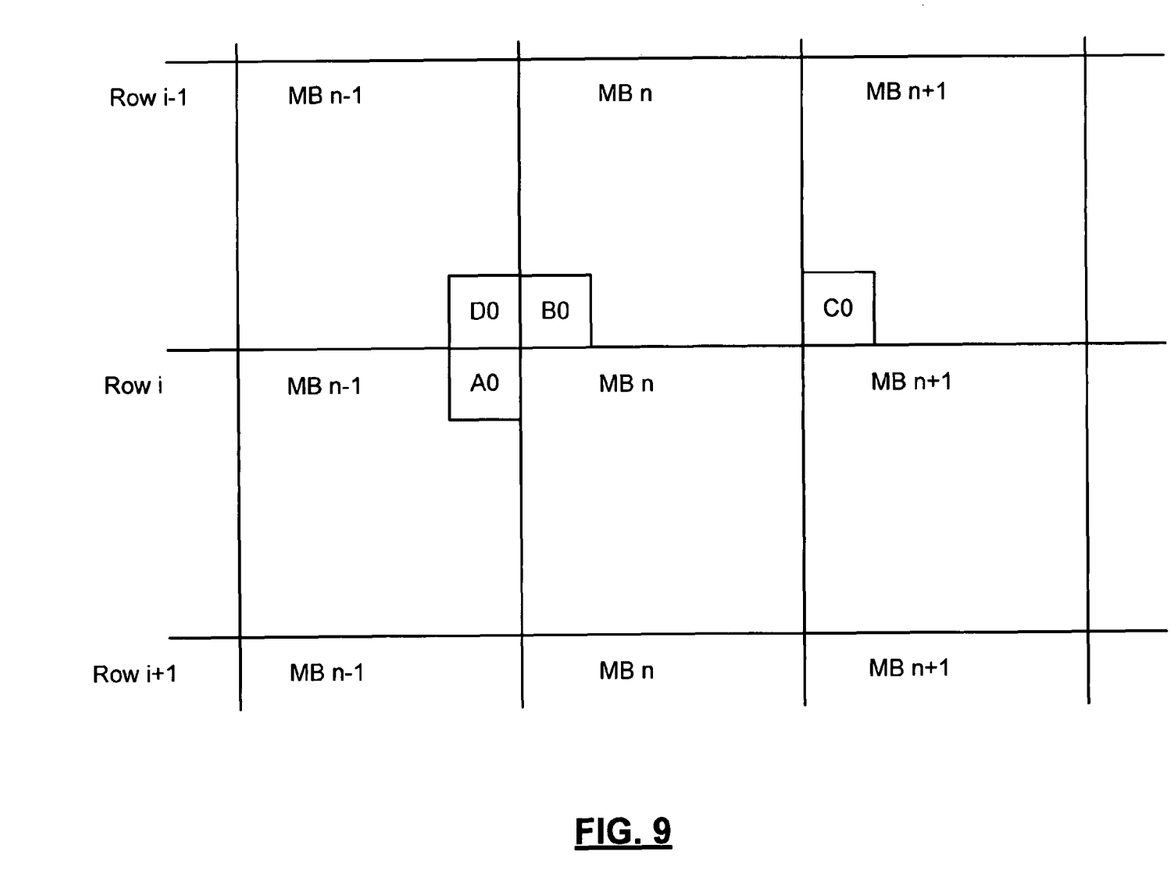
FIG. 9 presents a graphical representation of a plurality of macroblocks of a video input signal that show neighboring macroblocks that can be used in determining a predicted motion vector in accordance with an embodiment of the present invention.

FIG. 9 presents a graphical representation of a plurality of macroblocks of a video input signal that show the use of neighboring macroblocks in determining an estimated predicted motion vector in accordance with an embodiment of the present invention. Three macroblocks MB n−1, MB n and MB n+1 are show for three rows, row i−1, row i and row i+1 of a video input signal. The dots representing individual pixel locations have been omitted for clarity. In a conventional methodology, the predicted motion vector for MB n of row i would be based on the final motion vectors 4×4 determined for subblock D0 from MB n−1 of row i−1, subblock B0 from row i−1, subblock C0 from MB n+1 of row i−i along with subblock A0 from MB n−i of row i. However, this approach would require any calculations for MB n to wait for the final results for MB n−1 that contains subblock A0.

In an embodiment of the present invention, the cost associated with the refined motion vector and the motion search motion vector for a macroblock is calculated based on an estimated predicted motion vector that is based exclusively on neighboring macroblocks from at least one prior row of the video input signal. In the example presented above, the estimated predicted motion vector for MB n of row i is calculated based on subblocks D0, B0 and C0 from the row above (without including subblock A0 from the current row). In this fashion, the estimated predicted motion vector for each of the macroblocks in row i and can be calculated based exclusively on final motion vectors for subblocks from another row, such as row i−1. When processed as macroblock pairs as described above, the costs associated with top frame, top field, bottom frame and bottom field macroblocks are all based on neighboring macroblocks from a row above the top frame macroblock. As discussed in conjunction with FIG. 5, this allows the motion search module and motion refinement module to be pipelined and to optionally operate in parallel on an entire row at a time.

In a further embodiment of the present invention, the estimated predicted motion vector used to calculate a cost for either a motion search motion vector or a refined motion vector for one of the plurality of subblocks of a macroblock is used for each of the remaining plurality of subblocks. For example, the cost calculation used for each subblock of MB n of row i would be the estimated predicted motion vector that is based on subblocks D0, B0 and C0 from row i−1.

Figure 10:
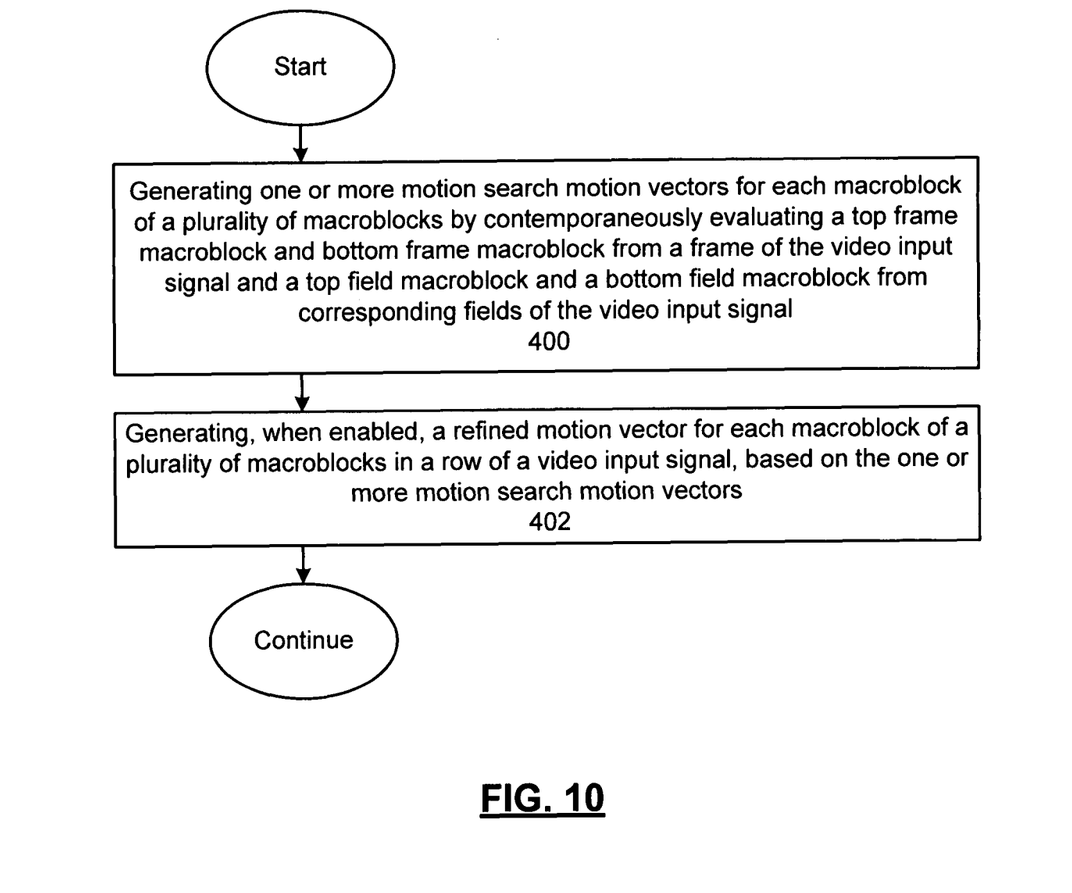
FIG. 10 presents a flowchart representation of a method in accordance with an embodiment of the present invention.

FIG. 10 presents a flowchart representation of a method in accordance with an embodiment of the present invention. In particular, a method is presented for use in conjunction with one or more of the features and functions described in association with FIGS. 1-9. In step 400, one or more motion search motion vectors are generated for each macroblock of a plurality of macroblocks by contemporaneously evaluating a top frame macroblock and bottom frame macroblock from a frame of the video input signal and a top field macroblock and a bottom field macroblock from corresponding fields of the video input signal. In step 402, when enabled the step is enabled, a refined motion vector is generated for each macroblock of the plurality of macroblocks, based on the one or more motion search motion vectors.

In an embodiment of the present invention, step 400 calculates a cost associated with the motion search motion vector based on an estimated predicted motion vector that is based exclusively on neighboring macroblocks from at least one prior row of the video input signal. The at least one prior row can include a row above a row of the video input signal that contains the top frame macroblock. In addition, step 400 can evaluates a plurality of partitions of each macroblock of the plurality of macroblocks into a plurality of subblocks and wherein the estimated predicted motion vector used to calculate a cost for one of the plurality of subblocks is used for each of the remaining plurality of subblocks. Further step 400 can compares the cost associated with the plurality of partitions of each macroblock to a cost threshold and that terminates the evaluation if the cost associated with a particular partition of the plurality of partitions compares favorably to the cost threshold.

In an embodiment of the present invention, step 400 calculates a cost associated a plurality of lines, and generates a cost associated with the top frame macroblock based on a cost accumulated for a plurality of top lines of the plurality of lines, generates a cost associated with the bottom frame macroblock based on a cost accumulated for a plurality of bottom lines of the plurality of lines, generates a cost associated with the top field macroblock based on a cost accumulated for a plurality of first-parity lines of the plurality of lines, and generates a cost associated with the bottom field macroblock based on a cost accumulated for a plurality of second-parity lines of the plurality of lines. In addition, step 400 can generate a field decision based on accumulated differences between the bottom field macroblock and a bottom field macroblock reference, the bottom field macroblock and a top field macroblock reference, the top field macroblock and the bottom field macroblock reference, and the top field macroblock and the top field macroblock reference.

In an embodiment of the present invention, step 400 initiates a small search in a small search region centered on a start motion vector, evaluates a cost associated with a plurality of candidate motion search motion vectors within the small search region, compares the cost associated with each with a small search cost threshold and terminates the evaluation when the cost associated with one of the plurality of candidate motion search motion vectors within the small search region compares favorably to the small search cost threshold. In addition, step 400 can generate the motion search vector compares a cost associated with a stationary motion vector to a stationary cost threshold and when, for a particular one of the plurality of macroblocks, the cost associated the stationary motion vector compares favorably to the stationary cost threshold, the step of generating the motion search module disables the step of generating the refined motion vector for the particular one of the plurality of macroblocks, and that assigns the stationary motion vector as the refined motion vector. Further step 400 can initiate a large search in a large search region, larger than the small search region, centered on the start motion vector, evaluates a cost associated with a plurality of candidate motion search motion vectors within the large search region, compares the cost associated with each with a large search cost threshold and terminates the evaluation when the cost associated with one of the plurality of candidate motion search motion vectors within the large search region compares favorably to the large search cost threshold.

Figure 11:
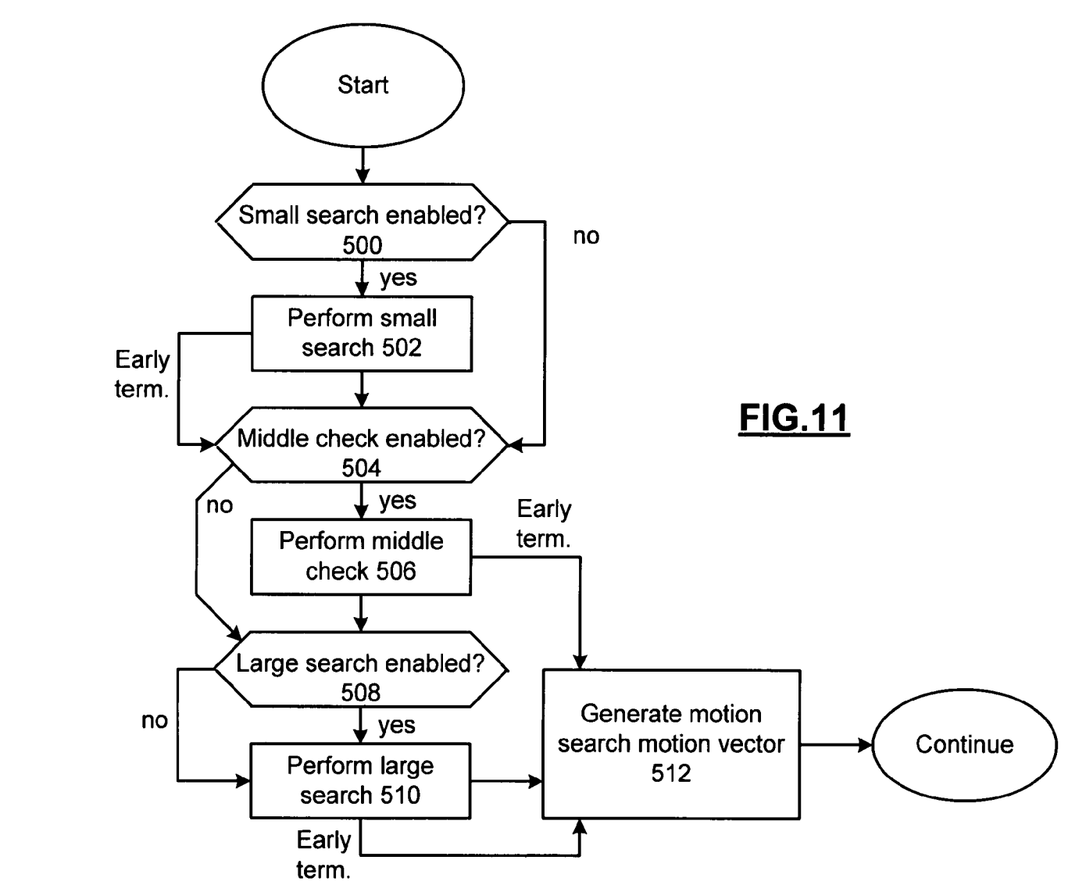
FIG. 11 presents a flowchart representation of a method in accordance with an embodiment of the present invention.

FIG. 11 presents a flowchart representation of a method in accordance with an embodiment of the present invention. A method is presented for use in conjunction with one or more of the features and functions described in association with FIGS. 1-10. In step 500 the method determines of the small search is enabled. If not, the method proceeds to step 504. If so, in step 502 the small search proceeds to evaluate the costs associated with each location in the small search region in an order, such as the middle column first, the two adjacent columns next and so on working outward until the entire small search region is evaluated. In an embodiment of the present invention, the small search procedure can include an early termination feature that is selectively enabled or disabled. When early termination is enabled, the cost associated with each candidate motion vector is compared with a small search cost threshold and the small search terminates the evaluation when the cost associated with one of the plurality of candidate motion search motion vectors within the small search region compares favorably to the small search cost threshold, the method assigns the motion search motion vector to the that particular candidate motion vector, disables the large search, and proceeds to determine if the middle check is enabled in step 504.

If the middle check is disabled, the method proceeds directly to step 508. If the middle check is enabled, the method proceeds to step 506 and an optional stationary check procedure compares a cost associated with a stationary motion vector (such as a motion vector with no offset, e.g. (0,0)) to a stationary cost threshold. When the cost associated the stationary motion vector compares favorably to the stationary cost threshold, the method disables the motion refinement module for the particular one of the plurality of macroblocks, terminates the middle search early and skips the large search and proceeds in step 512 to assign the motion search motion vector (the stationary motion vector in this case) directly as the refined motion vector. If not terminated early, the method proceeds to perform a middle check procedure that determines a most favorable cost motion vector from the plurality of candidate motion search motion vectors within the small search region, compares the most favorable cost motion vector to a middle cost threshold and when, for a particular one of the plurality of macroblocks, the cost associated the most favorable cost motion vector compares favorably to the middle cost threshold, the motion search module terminates the motion search and assigns the most favorable cost motion vector as the motion search motion vector. Otherwise, the method proceeds to step 508.

In step 508 the method determines if the large search is enabled. If not, the method proceeds to step 512, and if so, the method initiates a large search in step 510 in a large search region 266, larger than the small search region, centered on the start motion vector. The large search procedure evaluates a cost associated with a plurality of candidate motion search motion vectors within the large search region, compares the cost associated with each with a large search cost threshold and terminates the evaluation if the cost associated with one of the plurality of candidate motion search motion vectors within the large search region compares favorably to the large search cost threshold and proceeds to step 512. In step 512 the motion search motion vector is assigned to be the stationary motion vector if the threshold was met in step 506, or the motion vector from the small search procedure in step 502 if the small search was terminated early and the stationary search threshold was not met in step 506, or the motion vector from the large search in step 510, based on early termination. Otherwise, step 512 assigns the motion search motion vector to be the candidate motion vector in the large search region that has the most favorable (e.g. lowest) cost.

The present invention employs various cost thresholds that can be programmable and can be determined based on a priori information regarding the type of compression, the type of content in video input signal 110, the desired speed and or accuracy, or based on an adaptive assessment of the amount of motion present in the video input signal 110, or other properties of video input signal 110.

In preferred embodiments, the various circuit components are implemented using 0.35 micron or smaller CMOS technology. Provided however that other circuit technologies, both integrated or non-integrated, may be used within the broad scope of the present invention.

As one of ordinary skill in the art will appreciate, the term "substantially" or "approximately", as may be used herein, provides an industry-accepted tolerance to its corresponding term and/or relativity between items. Such an industry-accepted tolerance ranges from less than one percent to twenty percent and corresponds to, but is not limited to, component values, integrated circuit process variations, temperature variations, rise and fall times, and/or thermal noise. Such relativity between items ranges from a difference of a few percent to magnitude differences. As one of ordinary skill in the art will further appreciate, the term "coupled", as may be used herein, includes direct coupling and indirect coupling via another component, element, circuit, or module where, for indirect coupling, the intervening component, element, circuit, or module does not modify the information of a signal but may adjust its current level, voltage level, and/or power level. As one of ordinary skill in the art will also appreciate, inferred coupling (i.e., where one element is coupled to another element by inference) includes direct and indirect coupling between two elements in the same manner as "coupled". As one of ordinary skill in the art will further appreciate, the term "compares favorably", as may be used herein, indicates that a comparison between two or more elements, items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

As the term module is used in the description of the various embodiments of the present invention, a module includes a functional block that is implemented in hardware, software, and/or firmware that performs one or module functions such as the processing of an input signal to produce an output signal. As used herein, a module may contain submodules that themselves are modules.

Thus, there has been described herein an apparatus and method, as well as several embodiments including a preferred embodiment, for implementing a video encoder, motion compensation module, and motion search module for use therewith. Various embodiments of the present invention herein-described have features that distinguish the present invention from the prior art.

It will be apparent to those skilled in the art that the disclosed invention may be modified in numerous ways and may assume many embodiments other than the preferred forms specifically set out and described above. Accordingly, it is intended by the appended claims to cover all modifications of the invention which fall within the true spirit and scope of the invention.

What is claimed is:

1. A motion compensation module for use in a video encoder for encoding a video input signal, the motion compensation module comprising:
   a motion search module, that generates a motion search motion vector for each macroblock of a plurality of macroblocks by contemporaneously evaluating a top frame macroblock and bottom frame macroblock from a frame of the video input signal and a top field macroblock and a bottom field macroblock from corresponding fields of the video input signal, wherein the motion search module calculates a cost associated with the motion search motion vector based on an estimated predicted motion vector that is based on neighboring macroblocks exclusively from at least one prior row of the video input signal; and
   a motion refinement module, coupled to the motion search module, that when enabled, generates a refined motion vector for each macroblock of the plurality of macroblocks, based on the motion search motion vector.

2. The motion compensation module of claim 1 wherein the at least one prior row includes a row above a row of the video input signal that contains the top frame macroblock.

3. The motion compensation module of claim 1 wherein the motion search module evaluates a plurality of partitions of each macroblock of the plurality of macroblocks into a plurality of subblocks and wherein the estimated predicted motion vector used to calculate a cost for one of the plurality of subblocks is used for each of the remaining plurality of subblocks.

4. The motion compensation module of claim 3 wherein the motion search module compares the cost associated with the plurality of partitions of each macroblock to a cost threshold and that terminates the evaluation if the cost associated with a particular partition of the plurality of partitions compares favorably to the cost threshold.

5. The motion compensation module of claim 1 wherein the motion search module calculates a cost associated a plurality of lines, and generates a cost associated with the top frame macroblock based on a cost accumulated for a plurality of top lines of the plurality of lines, generates a cost associated with the bottom frame macroblock based on a cost accumulated for a plurality of bottom lines of the plurality of lines, generates a cost associated with the top field macroblock based on a cost accumulated for a plurality of first-parity lines of the plurality of lines, and generates a cost associated with the bottom field macroblock based on a cost accumulated for a plurality of second-parity lines of the plurality of lines.

6. The motion compensation module of claim 5 wherein the motion search module generates a field decision based on accumulated differences between the bottom field macroblock and a bottom field macroblock reference, the bottom field macroblock and a top field macroblock reference, the top field macroblock and the bottom field macroblock reference, and the top field macroblock and the top field macroblock reference.

7. The motion compensation module of claim 1 wherein the motion search module initiates a small search in a small search region centered on a start motion vector, evaluates a cost associated with a plurality of candidate motion search motion vectors within the small search region, compares the cost associated with the plurality of candidate motion search motion vectors within the small search region with a small search cost threshold and terminates the evaluation when the cost associated with one of the plurality of candidate motion search motion vectors within the small search region compares favorably to the small search cost threshold.

8. The motion compensation module of claim 7 wherein the motion search module determines a most favorable cost motion vector from the plurality of candidate motion search motion vectors within the small search region, compares the most favorable cost motion vector to a middle cost threshold and when, for a particular one of the plurality of macroblocks, the cost associated the most favorable cost motion vector compares favorably to the middle cost threshold, the motion search module terminates the motion search and assigns the most favorable cost motion vector as the motion search motion vector.

9. The motion compensation module of claim 7 wherein the motion search module, compares a cost associated with a stationary motion vector to a stationary cost threshold and when, for a particular one of the plurality of macroblocks, the cost associated the stationary motion vector compares favorably to the stationary cost threshold, the motion search module disables the motion refinement module for the particular one of the plurality of macroblocks, and that assigns the stationary motion vector as the refined motion vector.

10. The motion compensation module of claim 7 wherein the motion search module initiates a large search in a large search region, larger than the small search region, centered on the start motion vector, evaluates a cost associated with a plurality of candidate motion search motion vectors within the large search region, compares the cost associated with each with a large search cost threshold and terminates the evaluation when the cost associated with one of the plurality of candidate motion search motion vectors within the large search region compares favorably to the large search cost threshold.

11. A method for use in a video encoder for encoding a video input signal, the method comprising:
generating a motion search motion vector for each macroblock of a plurality of macroblocks by contemporaneously evaluating a top frame macroblock and bottom frame macroblock from a frame of the video input signal and a top field macroblock and a bottom field macroblock from corresponding fields of the video input signal, wherein generating the motion search vector includes calculating a cost associated with the motion search motion vector based on an estimated predicted motion vector that is based on neighboring macroblocks exclusively from at least one prior row of the video input signal; and
generating, when enabled, a refined motion vector for each macroblock of the plurality of macroblocks, based on the motion search motion vector.

12. The method of claim 11 wherein the at least one prior row includes a row above a row of the video input signal that contains the top frame macroblock.

13. The method of claim 11 wherein generating the motion search vector includes evaluating a plurality of partitions of each macroblock of the plurality of macroblocks into a plurality of subblocks and wherein the estimated predicted motion vector used to calculate a cost for one of the plurality of subblocks is used for each of the remaining plurality of subblocks.

14. The method of claim 13 wherein generating the motion search vector includes comparing the cost associated with the plurality of partitions of each macroblock to a cost threshold and that terminates the evaluation if the cost associated with a particular partition of the plurality of partitions compares favorably to the cost threshold.

15. The method of claim 11 wherein the step of generating the motion search vector includes calculating calculates a cost associated a plurality of lines, and generates a cost associated with the top frame macroblock based on a cost accumulated for a plurality of top lines of the plurality of lines, generates a cost associated with the bottom frame macroblock based on a cost accumulated for a plurality of bottom lines of the plurality of lines, generates a cost associated with the top field macroblock based on a cost accumulated for a plurality of first-parity lines of the plurality of lines, and generates a cost associated with the bottom field macroblock based on a cost accumulated for a plurality of second-parity lines of the plurality of lines.

16. The method of claim 15 wherein generating the motion search vector includes generating a field decision based on accumulated differences between the bottom field macroblock and a bottom field macroblock reference, the bottom field macroblock and a top field macroblock reference, the top field macroblock and the bottom field macroblock reference, and the top field macroblock and the top field macroblock reference.

17. The method of claim 11 wherein generating the motion search vector includes initiating a small search in a small search region centered on a start motion vector, evaluates a cost associated with a plurality of candidate motion search motion vectors within the small search region, compares the cost associated with the plurality of candidate motion search motion vectors within the small search region with a small search cost threshold and terminates the evaluation when the cost associated with one of the plurality of candidate motion search motion vectors within the small search region compares favorably to the small search cost threshold.

18. The method of claim 17 wherein the step of generating the motion search vector determines a most favorable cost motion vector from the plurality of candidate motion search motion vectors within the small search region, compares the most favorable cost motion vector to a middle cost threshold and when, for a particular one of the plurality of macroblocks, the cost associated the most favorable cost motion vector compares favorably to the middle cost threshold, the motion search module terminates the motion search and assigns the most favorable cost motion vector as the motion search motion vector.

19. The method of claim 17 wherein generating the motion search vector includes comparing a cost associated with a stationary motion vector to a stationary cost threshold and when, for a particular one of the plurality of macroblocks, the cost associated the stationary motion vector compares favorably to the stationary cost threshold, the step of generating the motion search module disables the step of generating the refined motion vector for the particular one of the plurality of macroblocks, and that assigns the stationary motion vector as the refined motion vector.

20. The method of claim 17 wherein the step of generating the motion search vector initiates a large search in a large search region, larger than the small search region, centered on the start motion vector, evaluates a cost associated with a plurality of candidate motion search motion vectors within the large search region, compares the cost associated with each with a large search cost threshold and terminates the evaluation when the cost associated with one of the plurality of candidate motion search motion vectors within the large search region compares favorably to the large search cost threshold.

21. A motion compensation module for use in a video encoder for encoding a video input signal, the motion compensation module comprising:
a motion search module, that generates a motion search motion vector for each macroblock of a plurality of macroblocks by contemporaneously evaluating a top frame macroblock and bottom frame macroblock from a frame of the video input signal and a top field macroblock and a bottom field macroblock from corresponding fields of the video input signal, that:
initiates a small search in a small search region centered on a start motion vector, evaluates the cost associated with a plurality of candidate motion search motion vectors within the small search region, compares the cost associated with each with a small search cost threshold and terminates the evaluation when the cost associated with one of the plurality of candidate motion search motion vectors within the small search region compares favorably to the small search cost threshold; and that
initiates a large search in a large search region, larger than the small search region, centered on the start motion vector, evaluates the cost associated with a plurality of candidate motion search motion vectors within the large search region, compares the cost associated with each with a large search cost threshold and terminates the evaluation when the cost associated with one of the plurality of candidate motion search motion vectors within the large search region compares favorably to the large search cost threshold; and
a motion refinement module, coupled to the motion search module, that when enabled, generates a refined motion vector for each macroblock of the plurality of macroblocks, based on the motion search motion vector;
wherein the motion search module compares a cost associated with a stationary motion vector to a stationary cost threshold and when, for a particular one of the plurality of macroblocks, the cost associated the stationary motion vector compares favorably to the stationary cost threshold, the motion search module disables the motion refinement module for the particular one of the plurality of macroblocks, and that assigns the stationary motion vector as the refined motion vector.

22. The motion compensation module of claim 21 wherein the motion search module calculates a cost associated with the motion search motion vector based on an estimated predicted motion vector that is based exclusively on neighboring macroblocks from at least one prior row of the video input signal.

23. The motion compensation module of claim 22 wherein the at least one prior row includes a row above a row of the video input signal that contains the top frame macroblock.

24. The motion compensation module of claim 21 wherein the motion search module evaluates a plurality of partitions of each macroblock of the plurality of macroblocks into a plurality of subblocks and wherein the estimated predicted motion vector used to calculate a cost for one of the plurality of sub blocks is used for each of the remaining plurality of subblocks.

25. The motion compensation module of claim 24 wherein the motion search module compares the cost associated with the plurality of partitions of each macroblock to a cost threshold and that terminates the evaluation if the cost associated with a particular partition of the plurality of partitions compares favorably to the cost threshold.

26. The motion compensation module of claim 21 wherein the motion search module calculates a cost associated a plurality of lines, and generates a cost associated with the top frame macroblock based on a cost accumulated for a plurality of top lines of the plurality of lines, generates a cost associated with the bottom frame macroblock based on a cost accumulated for a plurality of bottom lines of the plurality of lines, generates a cost associated with the top field macroblock based on a cost accumulated for a plurality of first-parity lines of the plurality of lines, and generates a cost associated with the bottom field macroblock based on a cost accumulated for a plurality of second-parity lines of the plurality of lines.

27. The motion compensation module of claim 26 wherein the motion search module generates a field decision based on accumulated differences between the bottom field macroblock and a bottom field macroblock reference, the bottom field macroblock and a top field macroblock reference, the top field macroblock and the bottom field macroblock reference, and the top field macroblock and the top field macroblock reference.

28. The motion compensation module of claim 21 wherein the motion search module determines a most favorable cost motion vector from the plurality of candidate motion search motion vectors within the small search region, compares the most favorable cost motion vector to a middle cost threshold and when, for a particular one of the plurality of macroblocks, the cost associated the most favorable cost motion vector compares favorably to the middle cost threshold, the motion search module terminates the motion search and assigns the most favorable cost motion vector as the motion search motion vector.

* * * * *